United States Patent [19]

Abrams, deceased et al.

[11] 4,366,096

[45] Dec. 28, 1982

[54] CELLULOSIC UREA FORMALDEHYDE COMPOSITIONS

[76] Inventors: Carl C. Abrams, deceased, late of Fair Lawn, N.J.; Bernice Abrams, administratrix, 15-30 Pollitt Dr. #2B, Fair Lawn, N.J. 07410; James R. Jones, 345 N. West End Ave., Lancaster, Pa. 17603

[21] Appl. No.: 933,431

[22] Filed: Aug. 14, 1978

Related U.S. Application Data

[63] Continuation-in-part of Ser. No. 775,191, Mar. 7, 1977, abandoned.

[51] Int. Cl.$^3$ .......................... C08G 12/12; C08L 1/02
[52] U.S. Cl. ................................. 525/498; 106/163 R; 428/526; 428/528; 428/529; 428/537; 527/309

[58] Field of Search .............................. 260/17.3, 17.2; 106/163 R

[56] References Cited

U.S. PATENT DOCUMENTS 3,787,368  1/1974  Lander ........................... 528/246 X Primary Examiner—Howard E. Schain
Attorney, Agent, or Firm—Mario A. Monaco; Rudolph J. Anderson, Jr.

[57] ABSTRACT

Non-flammable reactive particle compositions useful in forming shaped articles prepared from flammable cellulosic materials and a type of urea/formaldehyde resin. Processes for their preparation and a method of rendering flammable reactive particles substantially inflammable.

11 Claims, No Drawings

CELLULOSIC UREA FORMALDEHYDE COMPOSITIONS

This application is a continuation-in-part of United States Application Ser. No. 775,191 filed Mar. 7, 1977, now abandoned.

BACKGROUND OF THE INVENTION

Compositions containing cellulosic materials are made into particle boards, ceiling tiles, molded structures and the like. These compositions, however, are usually quite flammable because of the nature of the particles employed to prepare the composition. These cellulosic materials, for example, are wood, shell flour, cork as well as starch and other cellulosic waste products such as corncobs and rice wastes. These compositions are usually prepared by using these cellulosic materials to form commercial particle boards, ceiling tiles, and the like. The compositions are usually prepared by using urea/formaldehyde or phenol/formaldehyde resins as binders. These compositions, however, are flammable and for the most part the binders that are employed do not impart any non-flammable characteristics to the finished product. Therefore, it is often required that flame retardants be added. Although these flame retardants do in fact reduce the flammability characteristics of these materials, it is not sufficient to prevent the finished products from being considered essentially non-flammable. In addition, the use of flame retardants increases the cost of preparation of the various compositions.

We have found that certain urea/formaldehyde resins as described in U.S. Pat. No. 3,787,368 are excellent binders for reactive particles such as the cellulosic particles. The patent describes certain metal urea/formaldehyde resins as insoluble non-flammable polymers. We have found that these polymers not only act as excellent binders but also lead to compositions with reactive particles which are essentially non-flammable even though the particles from which they are made are indeed flammable. This is surprising since no mention is made in the above patent regarding the use of these polymers as binders, no less binders which would impart non-flammable characteristics to the finished composition. In addition, it is also surprising that these urea/formaldehyde resins impart non-flammable characteristics to the finished compositions, since other commercial binders such as PVC, phenol/formaldehyde and urea/formaldehyde resins which in themselves are also non-flammable do not impart non-flammable characteristics to compositions made therefrom. Further, compositions of this invention made from cellulosic materials and particularly wood and the urea/formaldehyde resins show a substantially higher oxygen index than do commercial compositions made from wood such as particle boards by Union Camp and U.S. Plywood. In addition, the tensile and flexural strength of the present compositions as well as nail and screw pull are generally comparable to commercial materials and in some compositions better than that found in the commercial wood compositions of various particle boards. The present compositions also have a very low swelling index, which is a significant feature because it is an indication that the composition is substantially water resistant.

It is therefore an object of this invention to prepare compositions from urea/formaldehyde resins and cellulosic materials, particularly wood, which are essentially non-flammable. Another object of this invention is to prepare compositions having good tensile and flexural strength, while still another object of this invention is to prepare cellulosic compositions which have a low swelling index. Yet another aspect of the invention, which is of substantial commercial value, is the ability to reduce press times for particle board manufacture from the present 5 to 11 minute cycle down to 1 to 5 minutes for boards $\frac{5}{8}''$ to $1\frac{1}{2}''$ thick. Another particular aspect of this invention is the use of iron sulfate or preferably chloride waste products from the manufacture of $TiO_2$ in the preparation of the resin. We have found that compositions forming excellent shaped articles can be prepared from these waste products which are substantially non-flammable and accordingly can help to eliminate an environmentsl waste disposal problem while forming a useful product.

DETAILS OF THE INVENTION

The present invention is directed to new substantially non-flammable compositions containing flammable reactive particles and certain urea-metal/formaldehyde resins as binders and to intermediates thereto. It is also directed to the use of certain urea-metal/formaldehyde resins in treating flammable reactive particles to render them substantially non-flammable. It is also directed to methods for the preparation of these compositions.

The urea-metal/formaldehyde resins used in the preparation of the compositions of this invention are obtained by first preparing an aqueous urea solution and reacting it with a formaldehyde solution. The aqueous urea solution is prepared with a metal compound. It is preapred by first mixing urea with a metal halide, nitrate, sulphate, phosphate or mixture thereof with urea under aqueous conditions. The preferred metal compound is a metal halide and especially the chloride. The metal of the metal compound may be titanium, hafnium, zirconium, aluminum, calcium, iron, manganese, magnesium, or other metal compound may be iron sulfate or chloride obtained as a waste by-product in the preparation of $TiO_2$ and mixtures thereof, particularly titanium, zirconium, aluminum, iron and especially titanium, zirconium, iron, ($F_e+^3$) or the iron waste product from $TiO_2$ manufacturing particularly the solution waste and especially a mixture of the solution waste and the preferred metal halides at a mole ratio of metal compound from the waste to other metal compounds of 20-70%. The urea and metal halide can be mixed neat, in water or in an organic solvent. For example, with titanium halides which undergo rapid hydrolysis, the urea and titanium halide can be mixed in an inert organic solvent such as benzene, carbon tetrachloride, xylene and the like. The thus formed product can be separated from the organic solvent by filtration or alternatively if one wishes, water can be added to this organic solvent and the urea/metal composition dissolved therein. The water layer can then be separated and the urea/metal composition used in the subsequent reaction with the aldehyde. In the neat reaction one may heat the reaction mixture in order to obtain reaction. Alternatively, in preparing the metal/urea composition, one may add both the urea and metal compound to water and carry out the reaction or add the metal compound to a urea solution or the urea to a metal compound solution. It can be seen that the procedure for preparing the urea/metal solution is not critical and than any number of procedures can be employed to carry out this part of the invention. The aqueous urea/metal solution thus formed after desired pH adjustment may then be added to an aqueous formaldehyde solution and the cellulosic material added thereto, or the formaldehyde solution may be mixed with the urea/metal solution containing the reactive particles or alternatively a portion of the reactive particles may be added to each of the urea/metal and formaldehyde solution and then mixed. The aqueous urea/metal solution is adjusted when necessary to a pH of 0.60 to 3.5, preferably 0.75 to 2.5, and especially about 1 to about 2 before it is combined with the formaldehyde solution or composition. The pH of the urea/metal solution can be adjusted by either adding an acid or base to reach the appropriate pH. Alternatively the acid or base used may be added to the urea/metal or formaldehyde solution or composition or partially to each. However, it is most preferred to add the acid or base to the urea/metal solution. Hereinafter only this preferred aspect will be further discussed. When an acid is required, preferably a strong acid, such inorganic acids as phosphoric acid, nitric acid, sulphuric acid, hydrochloric acid and the like may be used, as well as an organic acid such as trichloroacetic acid, alkyl or aryl sulfonic acid (i.e., methane or toluene sulfonic acid) and the like. The particular acid used to obtain the desired pH of the urea/metal solution is not critical; however, it is preferred to use hydrochloric acid. When a base is required any inorganic or organic base may be used. However, it is preferred to use an inorganic base such as an alkali or alkaline earth carbonate, bicarbonate or hydroxide and in particular sodium bicarbonate, potassium bicarbonate, sodium hydroxide or potassium hydroxide. The acid or base is preferably added as a concentrated aqueous solution or when feasible as a solid. When the metal compound used is a titanium, hafnium or zirconium salt and adjustment of pH is desired a base is necessary. Whereas when the metal compound is a ferric, aluminum, calcium, magnesium or manganese salt an acid is used is adjustment of pH is desired. The formaldehyde used in the preparation of the composition may be preferably commercial 37% aqueous formaldehyde (formalin) or may be a 40 to 60% aqueous formaldehyde solution, although the concentration is not critical.

In the preparation of the compositions of this invention, the molar ratio of urea to metal in the urea/metal solution is from about 6:1 to about 30:1 and preferably about 8:1 to about 20:1 and especially about 8:1 to about 16:1. The ratio of the urea to formaldehyde in the total composition or an equivalent basis is from about 1:.05 to about 1:5 and preferably about 1:0.1 to 1:2 and especially about 1:0.2 to about 1:0.5. The mole ratio of total water to total urea in the final composition is between 2 to 15 moles of water per mole of urea, preferably 3 to 10 and especially 4 to 7. The mole ratio of water to urea in the urea/metal solution is 1 to 13 moles of water per mole of urea and preferably 1 to 6, and especially 2.0 to 3.0.

The reaction mixtures may contain other ingredients and may be inert or reactive in the solution. Such ingredients are melamine, urea, thiourea, alkanols such as $C_{1-5}$ alkanols (methanol, propanol), phenol, resorcinol or phenolic resins. Also other materials within the contemplation of this invention are fillers both reactive and non-reactive, such as glass fibers, perlite, silica and fly ash. The use of these fillers and particularly the glass fibers and perlite lead to unexpected better physical properties. For this purpose from 0.5 to 10% and especially 2 to 6% of these fillers to reactive particles may be used. These additional materials may be added either to the urea/metal solution or composition or to the aqueous formaldehyde solution or composition or to both. Preferably the melamine, urea, thiourea and alcohols are added to the formaldehyde solution or composition and the resins and phenol to the urea/metal solution or composition. The use of melamine being a preferred embodiment of this invention may be in ratios of from about 0.05:1 to about 3:1 equivalence of melamine to formaldehyde and preferably from about 0.05:1 to 0.5:1 and especially 0.1 to 0.4:1. When urea is added to the formaldehyde solution the equivalent ratio may be 0.2:1 to 1.5:1 urea to formaldehyde and especially 0.3:1 to 0.5:1 of urea to formaldehyde. When thiourea is used the equivalent ratios are the same. The hydroxy compound mole ratio to urea in the urea/metal solution may be from 0.05 to 1 and especially 0.1 to 0.4. The weight ratios of resin to urea may be 1:.02 to 1:1.

The cellulosic material employed in this invention include wood, shell flour, cork, starch or ground waste products such as corncobs, rice wastes and the like as well as mixtures thereof. In the preferred aspect of this invention, wood is used. The wood may be any form such as planar shavings, chips, small diameter logs, flakes, slabs, sawdust, fibers and the like and preferably wood chips. The size and shape of these particles are not critical and can vary from large chunks and chips such as wood chips to small irregular particles such as sawdust and to powdered materials such as starch. With regard to the wood, a publication put out by the Borden Chemical Company, Adhesive and Chemical Division entitled "Particleboard Manufacture" and designated as SB-78J, April 1974 gives a description of the general size of the various wood particles and is incorporated herein by reference.

In the final urea/formaldehyde cellulosic composition, the dry weight ratio of cellulosic material to other reactants (such as urea, formaldehyde, metal compounds, other amines and alcohols but excluding water) may be from 20:1 to 1:1 particularly, and preferably from 9.0:1 to 3:1.

The percentage of binder (urea metal/formaldehyde resin) in the final composition is calculated on the basis that all the water which comes into the composition is due to the urea/formaldehyde system and all of this water is eventually lost due to evaporation. The moisture content of the cellulosic material is not considered. For example, a cellulosic composition containing 15% urea metal/formaldehyde resin binder is determined as follows using wood chips as an example for making particle board:

$$\frac{3402 \text{ g chips}}{0.85} = 4002.4 \text{ g total weight of finished dry board}$$

$$4002.4 - 3402 = 600.4 \text{ g dry urea metal/formaldehyde resin binder needed}$$

Using a 55% aqueous solution of total urea metal and formaldehyde solution the total weight of wet polymer needed is $$\frac{600.4}{.55} = 1091.6 \text{ gms.}$$

A typical formulation of wet polymer is composed of 38.4% urea metal aqueous solution; 54.2% of aqueous formaldehyde solution; and 7.4% added urea to the formaldehyde composition.

In the most general fashion, the compositions of this invention are prepared by adding the cellulosic material to the combined urea metal and formaldehyde solutions or any other desired order. However, it is preferred that the composition of this invention be prepared by admixing the urea metal solution with a portion of the reactive particles to form a urea metal-cellulose composition and to combine the remaining reactive particles with the formaldehyde solution to form a formaldehyde cellulose composition. In this manner, one can obtain two compositions which can remain for considerable periods of time without deterioration and then when it is desired can be combined to form the final composition. The dry weight ratio of cellulosic material (reactive particles) to urea of the urea/metal composition may be from 0.8 to 100:1 preferably 0.1 to 3.0:1 and especially 0.15 to 1.5:1 whereas the ratio of cellulosic material to formaldehyde in the formaldehyde solution may be from 0.1 to 90:1, particularly 0.1 to 5.0:1 and especially 0.2 to 4.0:1. These separate compositions can be dry or moist depending upon the amount of water and/or particles that are employed and are another aspect of this invention. Usually, with the preferred amount of water, each of these compositions with the reactive particles turn out to be a rather dry mixture. A particular feature of these intermediate compositions is that they can be stored for long periods of time and still be adequately used when desired. Reaction between the combined urea/metal composition and the formaldehyde composition containing the reactive particles therein is carried out under pressure. Desirably the pressure may be between about 50 and 500 psi, preferably between 100 and 250 psi and especially between 125 and 200 psi. Heat although not essential is desired in order to obtain reaction over a reasonable length of time. The temperature of reaction therefore is between 100° and 500° F. and preferably between 200 and 400° F. and especially between 200° and 300° F. The reaction is carried out at this temperature and pressure until the reaction is completed. This usually occurs between 1 and 8 minutes, at which point the pressure is removed and the temperature of the final product is allowed to proceed down to room temperature. For preaparing a particular shape of final composition such as a particle board, tile board, chair, stool or any other form, the reaction is carried out in the particular mold that will be required for preparing such a structure. The means for preparing such structures is common knowledge in the art. For example, a cellulosic material such as wood chips is blended with an aqueous formaldehyde solution until they are thoroughly mixed. Similarly, cellulosic material is blended with the urea/metal aqueous solution until they are thoroughly mixed. When another component is desired such as phenol, phenolic resin, etc., it may be blended with either the urea/metal solution or formaldehyde solution, and if the component is a liquid it is preferably mixed with the urea/metal or formaldehyde aqueous solution prior to mixing with the cellulosic material. The above two blended components are then blended together and added to an extruder or to a mold of the shape desired for the final composition and appropriate temperature and pressure applied. For example, when particle boards are desired the blended components are added to a press. The press may have top and bottom platens which are heated. For molded products, the bottom platen has a skirt surrounding the entire platen, thereby preventing the mixture of cellulosic material and binder from being extruded when pressure is applied. The platens may be preheated prior to adding the cellulosic material and binder or may be heated during or after these components are added to the bottom platen. The press is closed and an appropriate amount of pressure applied. The presure is applied until the polymerization reaction is completed and the formed board removed from the press. The board can also be made having a surface covering of paper, metal foil (i.e., aluminum), such as fiberglass mats or other materials which gives a smooth finished surface to the board. Surprisingly, the addition of paper, foil, fiberglass mats or other such material as a surface layer to the shaped article leads to additional strength of the article itself and is another aspect of this invention. These materials can be placed on the article during its preparation and can be carried out in the following manner using the preparation of a board as an example. The backing material can be placed on either or both surfaces of the pressing machine and adhered to the particle board when the cellulosic urea/formaldehyde composition is compressed therein. Decorative boards can be formed in this manner by merely using decorative backing material.

Another process for making boards in a continuous manner is to have the wood fibers carried on a conveyor. A top and side method of compaction is utilized. To form this into a matrix of the desired thickness and width the top compaction conveyor or other machinery is interrupted and spray heads of the premixed urea/metal composition and the aldehyde composition, in their proper ratios, discharge the resin onto and into the cellulose matrix so as to penetrate the full thickness. Spray heads or other techniques could, if necessary, be used to deposit resin on the underside of a thick matrix. The composition now including the resin proceeds into a reaction zone where heat is applied to cure the resin and allow steam to be dissapated. The boards thus produced can be cut to any length to suit its intended use.

EXAMPLE 1

PREPARATION OF METAL/AMIDE SOLUTION (a) Titanium Chloride-Urea Solution

600 Gms. of urea (11.0 moles) and 189.7 gms. (1.0 moles) of $TiCl_4$ are mixed at room temperature. To this mixture is added 457.5 gms. of water (25.4 moles) and the reaction mixture stirred at room temperature for 15 minutes. This reaction mixture is then adjusted to a pH of 1.5 by the addition of sodium bicarbonate.

(b) Ferric Chloride-Urea Solution

To 1176 gms. (65.3 moles) of water at room temperature is added 811.2 g. (3.0 moles) of ferric chloride hexahydrate and stirred to dissolve. To this solution is added 2160 g. (36.0 moles) of urea and the solution is stirred and very gently warmed to just dissolve the urea. The pH is then adjusted from 2.3 to 1.5 by slowly adding 104.0 g. (1.06 moles) of 37% HCl solution to yield 4256.0 g. of solution.

(c) Ferrous Sulfate-Urea Solution

To an 8 liter kettle is added 760 g. (5.0 moles) ferrous sulfate anhydrous, 3600 g. urea (60.0 moles), and 2500 g. (139 moles) water and heated slowly in a water bath with stirring to 45° C. to yield an orange turbid liquid with pH 3.4. To this is slowly added 596 g. (5.77 moles) 97% sulfuric acid which causes the temperature to rise to 60° C. and the pH to become 1.5. The final solution is clear pale green and weighs 7456 g.

(d) Ferric Chloride Hydrate - Urea Solution

In a 10 liter kettle is placed 3600 g (60.0 moles) of urea, 1352 g. (5.0 moles) of ferric chloride hexahydrate, and 1960 g. (109 moles) of water and stirred until dissolved while maintaining temperature at or below 20° C. to yield 6921 g. of a brown solution of pH 2.4.

(e) Ferric Chloride - Thiourea Solution

In a 5 liter flask is placed 324.4 g. (2.0 mole) anhydrous ferric chloride and 1826.8 g. (24.0 moles) of thiourea and shaken to mix. To this is added 2500 g. (139 moles) water and heated with stirring to 65° C. to fully dissolve. Upon cooling purple-brown and white crystals precipitate leaving a pale green liquid of pH 1.3 and a final weight of 4442 g.

(f) Aluminum Chloride Hydrate - Urea Solution

In a 20 liter kettle is mixed 1207 g. (5.0 moles) aluminum chloride hexahydrate and 3600 g. (60.0 moles) urea. To this is added 1960 g. (109 moles) water and stirred to dissolve to yield a clear solution of pH 2.5. To this is added 252.5 g. (2.53 moles) of 36.5% HCl solution to yield a colorless solution of pH 1.5 and weight 7035 g.

(g) Aluminum Chloride Hydrate - Thiourea Solution

In a 5 liter flask is placed 482.8 g. (2.0 mole) aluminum chloride hexahydrate and 1826.8 g. (24.0 moles) thiourea and shaken to mix. To this is added 2284 g. (127 moles) water and heated with stirring to 72° C. to obtain a clear, colorless solution. White crystals form upon cooling leaving a clear solution of pH 1.7 and a final weight of 4592 g.

(h) Chromium Chloride Hydrate - Urea Solution

In a 10 liter kettle is added 1337 g. (5.02 mole) chromium trichloride hexahydrate, 3600 g. (60.0 mole) urea, and 1800 g. (100 mole) water and warmed to 35° C. with stirring to dissolve to yield a dark green solution with pH 2.95. To this is added 363 g. (3.64 mole) 36.5% hydrochloric acid to yield 7157 g. of solution of pH 1.5.

(i) Manganous Chloride Hydrate - Urea Solution

In a 10 liter kettle is added 1005 g. (5.08 mole) manganous chloride tetrahydrate, 3600 g. (60.0 moles) urea, and 1800 g. (100 mole) water and warmed to 35° C. with stirring to dissolve to a clear pink solution of pH 7.3. To this is added 168 g. (1.68 mole) 36.5% hydrochloric acid and 233 g. (12.9 moles) water to yield 6806 g. of solution of pH 1.5.

(j) Magnesium Chloride Hydrate - Urea Solution

In a 10 liter kettle is placed 1026 g. (5.0 moles) of magnesium chloride hexahydrate of 99.1% purity, 3600 g. (60.0 moles) urea and 1600 g. (88.8 moles) water and warmed to 35° C. with stirring to yield a clear solution of pH 7.3. To this is added 262.4 g. (2.63 moles) of 35.5% hydrochloric acid to yield a solution of pH 1.5 and weight 6681 g.

(k) Calcium Chloride Anhydrous - Urea Solution

In a 10 liter kettle is placed 3600 g. (60.0 moles) of urea, 555 g. (5.0 moles) anhydrous calcium chloride, and 2645 g. (146.85 moles) water and stirred to dissolve to yield 6809 g. of solution of pH 8.3.

(l) Calcium Chloride Anhydrous - Urea Solution

To 3405 g. of the calcium chloride-urea water solution described in No. (k) above is added 121 g. (1.21 mole) 36.5% hydrochloric acid to yield 3526 g. of solution of pH 1.5.

(m) Zinc Chloride Anhydrous - Urea Solution

In a 10 liter kettle is placed 681 g. (5.0 mole) anhydrous zinc chloride, 3600 g. (60.0 moles) urea, and 2000 g. (111 moles) of water and stirred until all urea dissolved to yield a solution of pH 5.3. To this is added 215 g. (2.14 moles) of 36.2% hydrochloric acid to yield 6859 g. of colorless cloudy solution of pH 1.5.

(n) $FeCl_3$ - Urea Solution

In a 5 liter kettle is placed 1081 g. (4.0 moles) of ferric chloride hexahydrate, 2400 g. (40.0 mole) urea, and 1614 g. (89.6 moles) water and stirred to dissolve at ambient temperature to yield 5095 g. of solution of pH 2.2.

(o) Fe - Urea Composition (from Ferric Chloride Waste)

A solution of "Edgemoor ferric chloride waste" obtained from E. I. duPont which analysis revealed to contain 15.0% total iron of which 6.5% is Fe(II) and 8.5% Fe(III). The dried residue from this solution contains 33.8% iron, 0.82% aluminum, 0.92% titanium, and 43.4% chloride.

In a 5 liter kettle is placed 540 g. (4.0 moles) of urea, 71 g. (3.9 moles) water, and 260.4 g. of duPont "Edgemoor" waste. To this solution is added 84.0 g. (1.0 mole) sodium bicarbonate and dissolved to yield 915 g. of dark brown solution.

EXAMPLE 2

PREPARATION OF ALDEHYDE SOLUTION (a) 544.5 G. of 37% formaldehyde (6.65 moles) and 63.0 g. of melamine (0.5 moles) are stirred at room temperature until solution occurs (about 4 hours). To this reaction mixture is added 82.0 g. of urea (1.35 moles) and the mixture stirred at room temperature for 15 minutes.

(b) Melamine-formaldehyde solutions

The solution below is prepared by stirring melamine in 37% formaldehyde solution at ambient temperature until all solids dissolve to yield a clear solution.

| No. | $CH_2O$ 37% g | $CH_2O$ moles | Melamine g | Melamine, moles | Final wt g. |
|---|---|---|---|---|---|
| 1 | 7080 | 87.2 | 756 | 5.995 | 7834 |

EXAMPLE 3

PREPARATION OF PARTICLE BOARD 7.5 Lbs. (3402 gm.) of wood chips are weighed and separated into two parts. One part equals 4 lbs. and the other part equals 3.5 lbs. To the 4 lbs. is blended in the formaldehyde solution from Example 2(a) until thoroughly mixed, resulting in a substantially dry mix.

To the 3.5 lbs. is blended in 419.14 gm. of the metal-urea solution as in Ex. 1(a) and thoroughly mixed to yield a dry mix.

The above two parts are then blended together thoroughly and added to a hydraulic press. The press has top and bottom platens heated by circulating oil. The bottom platen has a skirt surrounding the entire platen thereby preventing the mixture of chips and binder from being extruded when pressure is applied. The platens are preheated to a temperature of 250° F. as measured by a thermocouple placed between the closed platens. Prior to adding the mix the platens are opened to reduce heat loss. The mix of chips and binder are added to the bottom platen and spread evenly over the platen. The press is closed to a gauge pressure of 50 tons or 175 psi and held under these conditions for 8 minutes. The pressure is slowly released to allow the generated steam to escape. The press is opened and the formed board (2 ft.×2 ft.×0.05 ft.) removed, cut to size and air cooled.

The following table compares the physical characteristics of the particle board prepared as in Example 3 above with various standard commercial boards. These commercial boards are standard boards prepared from wood and urea/formaldehyde resins.

TABLE 1

| | Particle Board of Present Invention | POLY CHEM INDUSTRIES INC. CONTROL PARTICLE BOARD | | | |
|---|---|---|---|---|---|
| | | UNION CAMP | US PLYWOOD WELDWOOD | Weyerhauser VERSA BOARD | TECO CERTIFIED |
| Density #/Ft.$^3$ | 63.7 | 49.9 | 48.2 | 42.0 | 43.2 |
| Tensile (PSI) | 801 ± 100 (44 days after preparation) | 1064 ± 134 | 881 ± 77 | 897 ± 99 | 713 ± 64 |
| Flexural (PSI) | 1170 ± 122 (44 days after preparation) | 1725 ± 123 | 1682 ± 150 | 2060 ± 333 | 1223 ± 123 |
| Nail Pull | | | | | |
| Thickness (min) | 1.14 | 1.93 | 1.29 | | |
| Load (PSI) | 18.8 | 73 | 33.5 | | |
| Screw Pull | | | | | |
| Thickness (min) | 1.19 | 1.93 | 1.29 | | |
| Load (PSI) | 139.1 | 249.4 | 154.5 | | |
| Limited Oxygen Index | 39–40 | 30–30.5 | 28.5–29 | | 27–27.5 |
| % Swell (Vol. Inc.) | | | | | |
| 2 Hrs. | 9.8 | 16.1 | | 1.7 | |
| 24 Hrs. | 15.8 | 23.0 | | 8.1 | |
| % Weight Gain | | | | | |
| In Air | 12.5 | 8.5 | | 9.1 | |
| 2 Hrs. | 27.5 | 47.2 | | 6.8 | |
| 24 Hrs. | 45.2 | 70.2 | | 16.1 | |

Note
(Conditions of preparation of control board)
Usual Pressure 250–500 PSI
Usual Temperature 290°–320° F. for 6–8 minutes (per Particle Partucle Board" manual published 1975)

Similarly, Example 3 above is carried out using the solution from Example 2(a) with the exception that melamine is not used therein to obtain a particle board.

Similarly, Example 3 above is carried out using the solution from Example 2(a) but without the added melamine and urea to obtain a particle board.

EXAMPLE 4

The procedure of Example 3 is carried out using the solutions from Example 1 (b) to 1 (o) in place of the metal-urea solution in Example 3 above and the product therefrom reacted with the formaldehyde-wood chips composition as described therein to obtain a particle board.

EXAMPLE 5

(a) 211.7 Grams of urea and 60.8 grams of TiCl$_4$ are mixed at room temperature. To this mixture is added 146.7 grams of water and the reaction mixture stirred at room temperature for 15 minutes and the reaction mixture adjusted to a pH of 1.5 by the addition of sodium bicarbonate. To this reaction mixture is then added 89.3 grams of phenol.

(b) 141.1 Grams of urea and 40.5 grams of TiCl$_4$ are mixed at room temperature. To this mixture is added 97.8 g. of water and the reaction mixture stirred for 15 minutes and the mixture adjusted to a pH of 1.5 with sodium bicarbonate. To this mixture is then added 200.2 g. of a phenolic resin prepared by Reichhold Chemical Co. #5342.

EXAMPLE 6

(a) 529.9 G. of 37% formaldehyde and 61.9 g. of melamine are stirred at room temperature until solution occurs. To this solution is added 80.8 g. of urea and the mixture stirred at room temperature for 15 minutes.

(b) 353.2 G. of 37% formaldehyde and 41.2 g. of melamine are stirred at room temperature until dissolution occurs. To this is added 53.8 g. of urea and the reaction mixture stirred for 15 minutes.

EXAMPLE 7

(a) 1588 G. of wood chips are added to the solution of part (a) of Example 5 and thoroughly mixed to form a metal/urea wood chip composition. Also, 1814 g. of wood chips are added to the solution of part (a) in Example 6 and thoroughly mixed to form a formaldehyde-wood chip composition. Both compositions are then thoroughly mixed and reacted as described in Example 3 to form a particle board.

(b) 1588 G. of wood chips are added to the solution of part (b) of Example 5 and thoroughly mixed to form a metal/urea wood chip composition. Also, 1814 g. of wood chips are added to the formaldehyde solution of (b) of Example 6 to form a formaldehyde-wood chip composition. Both compositions are then thoroughly mixed and reacted as described in Example 3 to form a particle board.

EXAMPLE 8

The following table demonstrates the different physical properties with particle boards prepared according to Example 3 from the intermediates prepared according to Examples 1(a) and 2(a) using the quantities of reactants as shown:

Table 2

Physical property of particle board having various wood chips:

(1) Particle board containing 90% wood chips, 10% binder
 (a) Quantities for Example 1(a), $TiCl_4$=38.3 Urea=133.3, water=92.4
 (b) Quantities for Example 2(a), 37% formaldehyde=126.6 melamine=39.4, urea=46.6
Density=47.9 lbs./$F^3$
LOI (limited oxygen index)=33-33.5
Tensile strength PSI—1st day—447±28, 42nd day—395±61
Flexural strength PSI 1st day—606±83, 42nd day—1147±195
Nail pull—1.31 mm. at 12.5 psi
Screw Pull—1.24 mm. at 72.5 psi
Water immersion:
 % weight gain in air after 21 days=10.3
 % weight gain @ 2 hrs.=100
 % weight gain @ 24 hrs.=105.5
 % volume gain @ 2 hrs.=45
 % volume gain @ 24 hrs.=48.9
(2) Particle board containing 85% wood chips, 15% binder
 (a) Quantities for Example 1(a), $TiCl_4$=60.8 Urea=211.7, water=146.7
 (b) Quantities for Example 2(a):
Density=63.7 lbs./$F^3$
LOI=39-40
Tensile strength PSI—2nd day—764±82, 44th day 801±100,
Flexural strength PSI—2nd day—1424±222, 44th day—1170±122
Nail pull—1.14 mm. at 18.8 psi
Screw pull—1.19 mm. at 139.1 psi
Water immersion:
 % weight gain in air=12.0
 % weight gain @ 2 hrs=27.5
 % weight gain @ 24 hrs.=45.2
 % volume gain after 2 hrs.=9.2
 % volume gain after 24 hrs.=15.8
(3) Particle board containing 80% wood chips, 20% binder
 (a) Quantities for Example 1(a), $TiCl_4$=43.5, urea=300.1, water=105.0
 (b) Quantities for Example 2(a):
Density=61.0 lbs./$F^3$
LOI=36-36.5
Tensile strength PSI—2nd day—922±93
Flexural strength PSI—2nd day—1688±168
Nail pull—1.06 mm. at 18.9 psi
Water immersion:
 % weight gain in air=11.3
 % weight gain @ 2 hrs.=18.5
 % weight gain @ 24 hrs.=44.2
 % volume gain after 2 hrs.=11.7
 % volume gain after 24 hrs.=18.3

EXAMPLE 9

Reaction Example 8 (2) is carried out at a temperature of 220° F. instead of 250° F. to form particle boards having the following physical properties respectively:
 (a) Density—64.5 lbs./$F^3$
Tensile strength—2nd day after preparation—722±135 PSI
Flexural strength—2nd day after preparation—2188±205 PSI
 (b) Density—56.7 lbs./$F^3$
Tensile strength—8th day—790±117, 29th day—803±25 PSI
Flexural strength—8th day—1815±94, 29th day 1650±343 PSI
Nail pull—1.18 mm. at 16.6 psi
Screw pull—1.11 mm. at 161.7 psi

EXAMPLE 10

This example shows the effect of temperature on the preparation of the compositions containing phenol. It is to be noted no substantial change occurs until a temperature of 250° F. is reached.

(a) 419.2 gms. of metal/urea solution as prepared in Example 1(a), 591.6 gms. of formaldehyde solution as prepared in Example 2(a), 86.8 gms. of urea and 101.5 gms. of 88% phenol are reacted with 7.5 lbs. of wood chips as described in Example 3 at 200° F. This results in a particle board having 82.8% wood chips, 15% urea/formaldehyde resin and 2.2% phenol. The following data is obtained at the designated reaction temperatures:

| Temperature | 200° F. | 220° F. | 250° F. |
| --- | --- | --- | --- |
| Tensile strength PSI | 459 ± 46 | 499 ± 74 | 962 ± 36 |
| Flexural strength PSI | 1178 ± 248 | 1173 ± 423 | 1574 ± 259 |

Similarly, when the above reaction is carried out at 250° F. using 165 gm. (88% phenol, (81.5% wood chips, 15% urea/formaldehyde, 3.5% phenol) and 212.6 gm. (88% phenol (80.9% wood chips, 14.7% urea/formaldehyde, 4.4% phenol), the following results are obtained:
Tensile strength—853±150 and 611±84 PSI
Flexural strength—1727±143 and 1461±156 PSI, respectively.

EXAMPLE 11

A phenolic resin particle board is prepared containing 85% wood chips, 10% urea/formaldehyde and 5% of a phenolic resin (prepared by Reichhold Chemical Co. #5342) according to Example 3 and having the following ingredients: 279.4 grams of metal/urea solution obtained as shown in Example 1(a), 394.4 g. of formaldehyde solution prepared according to Example 2(a) and 53.8 g. of urea and 200.2 g. of resin. The board has a density of 63.3 lbs./$F^3$, LOI of 35-36, tensile strength of 1368±153, of flexural strength of 1952±243 and nail pull 1.15 mm., 26.5 psi, screw pull 1.15 mm., 176.3 psi.
Water Immersion data:
 % weight gain in air=10.4
 % weight gain @ 2 hrs.=19.7
 % weight gain @ 24 hrs.=50.1
 % volume gain @ 2 hrs.=2.3
 % volume gain @ 24 hrs.=5.8

EXAMPLE 12

Particle board from $FeCl_3$ solution

A particle board is prepared according to Example 3, using 593.8 g. of a $FeCl_3$ solution prepared according to Example 1(b), 838.1 g. of a formaldehyde solution prepared according to Example 2(a) and 114.4 g. of urea. This results in a particle board containing 80% wood chips and 20% urea/formaldehyde.
The following data is obtained:
 Density—29.8 lbs./$F^3$, LOI 41-41.5
 Tensile strength—498±49 PSI Flexural strength—1018±160 PSI

EXAMPLE 13

Particle board from a mixture of TiCl₄ and FeCl₃ solution

The procedure of Example 3 is followed using 296.9 g. of a TiCl₄ solution prepared according to Example 1(a), 296.9 g. of a FeCl₃ solution prepared according to Example 1(b) and 114.4 g. of urea. This results in a particle board having 80% wood chips and 20% urea/formaldehyde, with the following characteristics:

Density—66.7 lbs./F³, LOI—41.5–42
Tensile Strength—537±67 PSI

Flexural strength—1899±482 PSI.

EXAMPLE 14

The following formulations result in a 25, 30 and 40% wood chip-urea/formaldehyde composition respectively:

(1) 7.5 lbs. wood chips
 (a) 1.75 lbs. of metal/urea solution (Example 1(a))
 (b) 2.46 lbs. of formaldehyde solution (Example 2(a))
 (c) 0.34 lbs. of urea
(2) 7.5 lbs. wood chips
 (a) 2.24 lbs. metal/urea solution (Example 1(a))
 (b) 3.17 lbs. formaldehyde solution (Example 2(a))
 (c) 0.43 lbs. urea
(3) 7.5 lbs. wood chips
 (a) 3.49 lbs. metal/urea solution (Example 1(a))
 (b) 4.93 lbs. formaldehyde solution (Example 2(a))
 (c) 0.67 lbs. urea The above formulations are blended and structural compositions prepared according to Example 3.

Similarly, structural compositions may be prepared by blending the wood chips in the following manner and Example 3 carried out:

In (1) above (a) is blended with 3.5 lbs. of wood chips, (b) is blended with 4.0 lbs. of wood chips and both blended together.

In (2) above (a) is blended with 7.5 lbs. of wood chips and (b) blended therein.

In (3) above (b) is blended with 7.5 lbs. of wood chips and (a) blended therein.

EXAMPLE 15

The following table 1 represents various formulations of urea/formaldehyde prepared according to Example 1(a) and 2(a); and subsequently reacted in a manner as shown in Example 3 to form the desired compositions.

The table demonstrates how various ratios of materials and pH conditions of the reactions can be used to obtain compositions of this invention.

TABLE I

|       | Urea | TiCl₄ | H₂O    | H₂O/urea | 37% CH₂O | CH₂O | urea/CH₂O | pH  |
|-------|------|-------|--------|----------|----------|------|-----------|-----|
| (1)   |      |       |        |          |          |      |           |     |
| Moles | 6    | 1     | 16.4   | 0.8/1    | —        | 3    | 1/0.5     | 0.3 |
| Grams | 360  | 189.7 | 29.6   |          | 24.3     | 90   |           |     |
| %     | 42.6 | 22.4  | 35     |          |          |      |           |     |
| Moles | 6    | 1     | 30.5   |          | —        | 5.4  | 1/0.9     |     |
| Grams | 360  | 189.7 | 549.7  | 1.53/1   | 437.8    | 162  |           |     |
| %     | 32.7 | 17.3  | 50     |          | —        | —    |           |     |
| (2)   |      |       |        |          |          |      |           |     |
| Moles | 8    | 1     | 20.0   |          | —        | 12   |           |     |
| Grams | 480  | 189.7 | 360.6  | 0.75/1   | 973      | 360  | 1/1.5     | 0.4 |
| %     | 46.6 | 18.4  | 35     |          | —        | —    |           |     |
| Moles | 8    | 1     | 37.2   |          | —        | 40   | 1/5       |     |
| Gram  | 480  | 189.7 | 669.7  | 1.39/1   | 3243     | 1200 |           |     |
| %     | 35.8 | 14.2  | 50     |          | —        | —    |           |     |
| (3)   |      |       |        |          |          |      |           |     |
| Moles | 16   | 1     | 34.4   |          | —        | 8    | 1/0.5     | 1.0 |
| Grams | 960  | 189.7 | 619.1  | 0.64/1   | 648.6    | 240  |           |     |
| %     | 54.3 | 10.7  | 35     |          | —        | —    |           |     |
| Moles | 16   | 1     | 63.9   |          | —        | 14.4 | 1/0.9     |     |
| Grams | 960  | 189.7 | 1149.7 | 12/1     | 1167.6   | 432  |           |     |
| %     | 41.8 | 8.2   | 50     |          |          |      |           |     |
| (4)   |      |       |        |          |          |      |           |     |
| Moles | 30   | 1     | 59.5   |          | —        | 45   |           |     |
| Grams | 1800 | 189.7 | 1071.4 | 0.6/1    | 3648.6   | 1350 | 1/1.5     |     |
| %     | 58.8 | 6.2   | 35     |          | —        | —    | 1.7       |     |
| Moles | 30   | 1     | 110.5  |          | —        | 150  |           |     |
| Grams | 1800 | 189.7 | 1989.7 | 1.1/1    | 12,167   | 4500 | 1/5       |     |
| %     | 45.2 | 4.2   | 50     |          | —        | —    |           |     |

EXAMPLE 16

7.5 Lbs. (3402 gm.) of wood chips and 419.14 gm. of the metal-urea solution from Example 1(a) are thoroughly blended to yield a dry mix.

Premeasure 199.5 gm. (6.65 moles) of paraformaldehyde, in powdered form, then thoroughly blend into the cellulose-urea/metal composition as described above.

Place the above blended composition into a hydraulic press where top and bottom platens are at a temperature equal or exceeding the decomposition. Temperature of the paraformaldehyde is closed and held at 200 PSI for 10 minutes then pressure is gradually reduced to permit steam from the aqueous component to escape. The product is then removed from the press and allowed to air cool.

We claim:

1. A cellulosic material composition comprising the reaction of:
   (1) a solution of a urea/metal compound at a pH of from 0.6 to 3.5 wherein the metal compound is the halide, nitrate, sulfate or phosphate of Ti, Hf, Zr, Al, Ca, Fe, Mn, Mg and mixtures thereof at a mole ratio of urea to metal compound of 6:1 to 30:1;
   (2) an aqueous formaldehyde solution at an equivalent ratio of 1:05 to 1:5 of urea to formaldehyde; and having a mole ratio of total water to total urea of 2 to 15; and (3) a cellulosic material in a ratio of 20:1 to 1:1 on a dry weight basis to the total weight of (1) and (2): under pressure.

2. A wood composition comprising the reaction of:
(1) a solution of a urea/metal compound at a pH of from 0.6 to 3.5 wherein the metal compound is the halide, nitrate, sulfate or phosphate of Ti, Hf, Zr, Al, Ca, Fe, Mn, Mg and mixtures thereof at a mole ratio of urea to metal compound of 6:1 to 30:1;
(2) an aqueous formaldehyde solution at an equivalent ratio of 1:05 to 1:5 of urea to formaldehyde; and having a mole ratio of total water to total urea of 2 to 15; and
(3) a wood material in a ratio of 20:1 to 1:1 on a dry weight basis to the total weight of (1) and (2); under pressure.

3. The composition of claim 2 wherein the metal compound is the titanium, zirconium, aluminum, iron halide or mixtures thereof.

4. The composition of claim 2 wherein the pH of the urea/metal compound solution is from about 0.75 to about 2.5, the mole ratio of urea to metal compound is from about 8:1 to about 20:1, said metal compound is the halide, nitrate, sulfate or phosphate of titanium, zirconium, aluminum or iron, the equivalent weight of urea to formaldehyde is 1:0.1 to 1:2.0; the total water in part (1) is 1 to 6 moles to one mole of urea, and the ratio of wood material is 9:1 to 3:1 on a dry weight basis to the total weight of (1) and (2).

5. The composition of claim 4 wherein the metal compound is the titanium, zirconium, aluminum or iron halide and the wood of part (3) is in the form of wood chips.

6. The composition of claim 2 wherein there is present melamine, an aliphatic alcohol, aromatic hydroxy compound or a phenolic resin and combinations thereof.

7. The composition of claim 6 wherein there is present melamine in an equivalent ratio of 0.05:1 to 3:1 of melamine to formaldehyde.

8. A wood composition comprising the reaction of:
(1) an aqueous solution of a titanium-halide/urea compound at a pH of from about 1.0 to about 2.1, said titanium halide being present at a mole ratio of about 8:1 to about 16:1 of urea to titanium halide, and a ratio of water to urea of 1 to 6; with
(2) an aqueous formaldehyde solution at an equivalent ratio of total urea to formaldehyde of 1:0.1 to about 1:2, having therein melamine, an aliphatic alcohol, phenol, phenolic resin or mixtures thereof in an equivalent ratio of melamine to formaldehyde of 0.05:1 to 3:1, a mole ratio of phenol to urea of 0.1 to 0.4, a mole ratio of aliphatic alcohol to urea of 0.05 to 1, and a weight ratio of phenolic resin to urea of 1:03 to 1:1, and having a total water content of (1) and (2) of 4 to 7 moles of water to one mole of total urea, and (3) 75–95% of wood on a dry weight basis of (1) and (2), under pressure.

9. The composition of claim 8 wherein the formaldehyde solution contains melamine in an equivalent ratio of 0.1 to 0.4:1 of melamine for one mole of formaldehyde and the percentage of wood is 75 to 95%.

10. The composition of claim 8 wherein the urea solution contains phenol in a mole ratio of 0.1 to 0.4:1 moles phenol to one mole of urea and the percentage of wood is 80 to 85%.

11. The composition of claim 8 wherein the wood material is in the form of wood chips.

* * * * *